Oct. 5, 1965         M. LEIBOW         3,209,800
MACHINE FOR EDGE TRIMMING
Filed April 22, 1963                       2 Sheets-Sheet 1

INVENTOR
Martin Leibow

BY

ATTORNEY

INVENTOR
Martin Leibow

BY

ATTORNEY

United States Patent Office 3,209,800
Patented Oct. 5, 1965

3,209,800
MACHINE FOR EDGE TRIMMING
Martin Leibow, 10152 Creekmere Circle, Dallas, Tex.
Filed Apr. 22, 1963, Ser. No. 274,397
4 Claims. (Cl. 144—134)

The present invention relates to methods for applying laminates to smooth surfaces, as in the manufacture of furniture, and to machines for providing the bands of laminate applied to the edges of flat surfaces.

Many types of furniture are manufactured using a relatively inexpensive flat material such as plywood or flake board to which either a low pressure laminate such as "Marlite" or a high pressure laminate such as "Formica" is bonded to provide the desired appearance and surface characteristics. In the manufacture of such furniture, it is common practice to cut a thin band of material which is slightly wider than the thickness of the surface to be covered and bond this band to the edge of the board. After a suitable drying time, a hand router is used to rout the edge of the band even with the surfaces of the board. It is preferred that thereafter a sanding operation be performed. Following the routing and, if utilized, sanding operations, the desired laminate is applied to the surfaces of the board. It will be noted that it is necessary that drying time be provided after the application of the band to the edge of the board and that the banding must be routed and sanded prior to application of the laminate to the major surfaces of the board.

Certain disadvantages are inherent in the above described method of applying laminate to a flat surface in that the router follows the contour of the surface of the board and if the board is uneven for some reason, the edge of the banding will not be straight. In addition, a small crack equal to the thickness of the bonding material used for attaching the laminate to the flat surface will appear between the laminate covering the flat surface and the banding material.

The present invention provides an improved method for applying a laminate to flat surfaces and a machine for producing the banding used in practicing the method. In accordance with the method of the present invention, strips of banding are formed with beveled edges such that the outside surface of the banding is slightly wider than the thickness of the board to be covered and the inside surface of the banding material, the side which is actually bonded to the board, is substantially the same width as the edge of the board. The beveled edge of the banding makes it possible to immediately apply the laminate to the flat surface of the board without the necessity for waiting for the bond of the banding to set and the subsequent routing and sanding steps. It will, therefore, be seen that the application of laminate to flat surfaces is greatly expedited by the method of the present invention as the number of drying cycles is reduced considerably, especially in those objects having complex shapes, and the routing and sanding operations are eliminated.

The machine provided by the present invention is similar in some respects to wood working machines in use today such as a table saw and others in that it utilizes a work table having a planar work surface with a guide fence extending across the surface for controlling the path of the banding as it moves through the machine. An important feature of the machine is a plurality of members which resiliently bear against the edge of the banding which is being shaped, continuously biasing the banding against the guide fence. The tool used for forming the edge of the banding is preferably a router blade but can be any other type of suitable tool. The cutting tool is hingedly mounted to the machine such that it is possible to provide a straight edge or any desired degree of bevel to the edge of the banding.

Many objects and advantages of the invention will become apparent to those skilled in the art as the following detailed description of the same unfolds when taken into conjunction with the appended drawings wherein like reference numerals denote like parts and in which.

Figure 1:
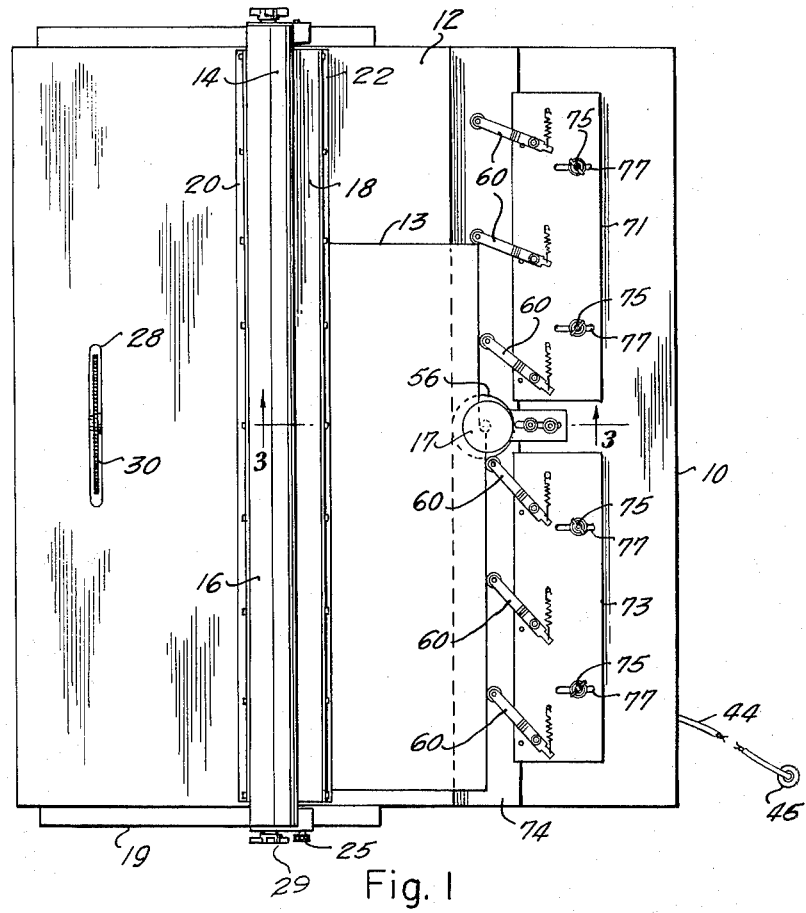
FIGURE 1 is a plan view of a preferred embodiment of the machine provided by the present invention.
Figure 2:
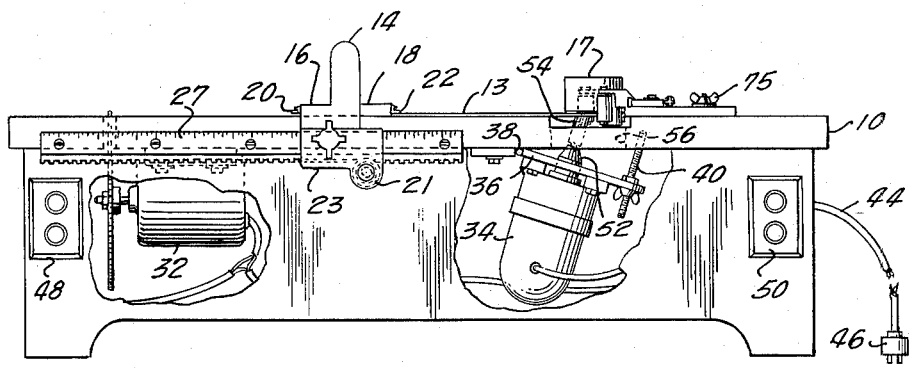
FIGURE 2 is a side elevation view of the apparatus provided by the present invention.

The machine provided by the present invention is seen to include a work table 10 having a planar work surface 12. A guide fence 14 extends across the work surface 12 of the table 10 for guiding and positioning the strip of banding 13 whose edges are to be dressed. The guide fence 14 is suitably of the type conventionally used on table saws and similar pieces of equipment. However, it is preferred that the guide fence 14 be of a generally inverted T-shaped configuration with arms 16 and 18 extending away from the main body of the guide. The width of the arms 16 and 18 is preferably such that the separation between the main body 15 of the guide fence and the shield 17 covering the cutting blade is sufficient to permit a hand to pass along the fence even though the work piece may be relatively narrow, as in the order of ½" or less.

Figure 3:
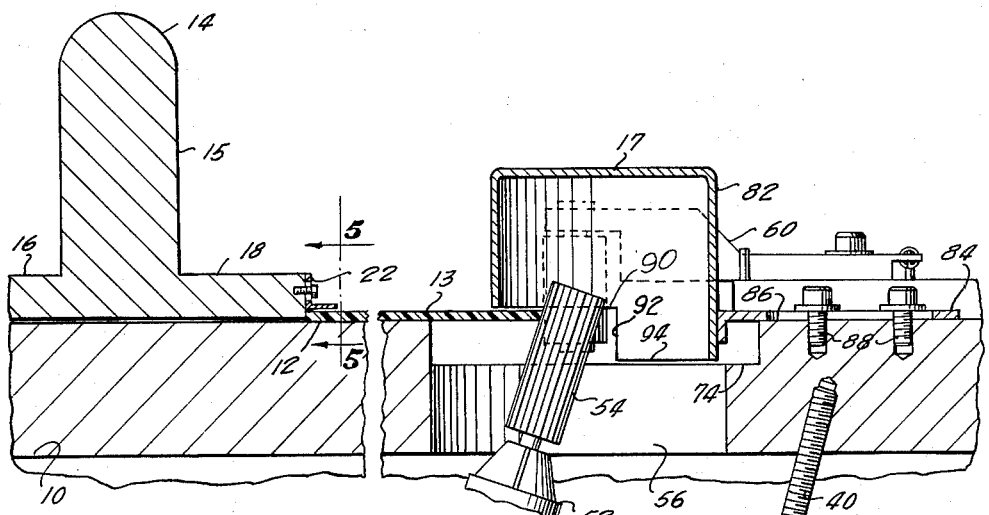
FIGURE 3 is a view, partially in cross section, taken along line 3—3 of FIGURE 1.
Figure 4:
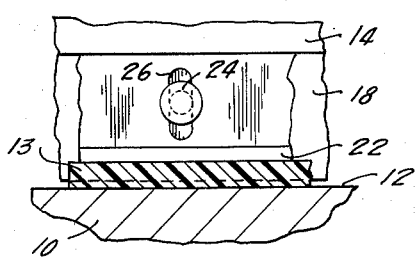
FIGURE 4 is a view, partially in cross section, taken along line 4—4 of FIGURE 3 illustrating the details of the bearing edge of a guide fence according to the present invention.

As best illustrated in FIGURES 3 and 4, L-shaped channels 20 and 22 are adjustably attached to the ends of the arms 16 and 18 respectively by set screws 24 which pass through elongated slots 26. The separation between the lower surface of the L-shaped channels 20 and 22 and the planar work surface 12 is adjusted such that the strip of banding 13 may freely slide along the edge of the arms 16 and 18, but the channels 20 and 22 prevent or restrain any tendency of the cutting tool to raise the work piece from the surface 12 or any tendency of the work piece to curl in the case of thin pieces of material. A gear rack 19 extends along one side of the table 10. A gear 21 enclosed within the housing 23 engages the rack 19, causing the guide fence 14 to slide along the surface 12 as knob 25 is turned. Indicia 27 may be provided to facilitate positioning of the guide fence 14. Suitable means (not shown) actuated by handle 29 can be provided for locking the guide fence 14 in a desired position.

A saw slot 28 extends through work table 10 as shown, permitting a saw blade 30 to project from beneath the table above the surface 12. The saw blade 30 is suitably driven by an electric motor 32 which may be mounted to the under side of table 10. A second electric motor 34 is attached to a mounting bracket 36 as shown. Mounting bracket 36 is hingedly attached at 38 to the under surface of the table 10. A stud 40 which passes through the mounting bracket 36 is connected to the table and, in conjunction with wing nut 42, provides a means for controlling the angle between the mounting bracket 36 and the table 10. As the angles are complementary, the angle of the bevel formed on the strip of banding 13 will be equal to the angle between the bracket 36 and the table 10. A scale (not shown) may be provided for indicating this angle. A cord 44 having a plug 46 on its end is provided for connecting the electric motors 32 and 34 to a suitable source of electric energy. Switches 48 and 50 are provided for controlling the application of power to the motors 32 and 34 respectively.

A chuck 52 is connected to the end of the shaft of motor 34 for receiving and holding the cutting tool 54, which is suitably a router blade. As best seen in FIGURE 3, the tool 54 extends through an opening 56 formed in the table 10. As the strip of banding 13 is moved across the planar work surface 12, the tool 54 removes material to dress the edge and provide the desired amount of bevel.

Figure 5:
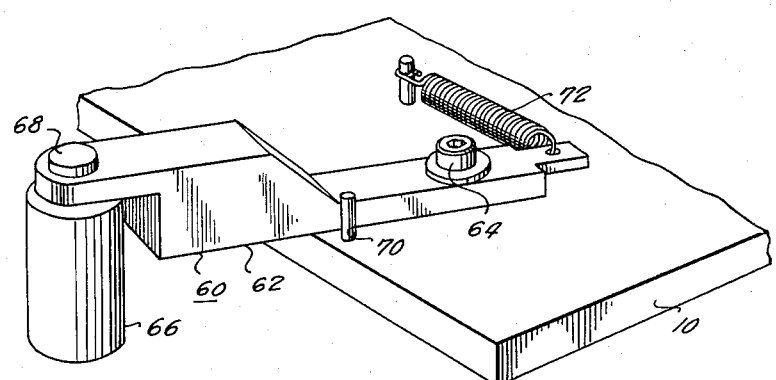
FIGURE 5 is a perspective view illustrating a preferred type of spring loaded roller for use in practicing the invention.

One of the important features of the present invention is the provision of a number of members 60 which bear against the banding 13 as it moves across the surface 12, continuously biasing the banding 13 against the edge of the guide fence 14. A preferred form of member 60 is shown in FIGURE 5. As illustrated, the member 60 suitably includes a support 62 pivotably mounted to the table 10 by screw 64 for rotational movement in a horizontal plane. A roller 66 is mounted on a shaft 68 which depends from the support 62. The roller 66 bears against the edge of the work piece as it moves across the table. A pin stop 70 is suitably provided to insure that the member 60 will be inclined slightly in the direction of movement of the work piece across the machine, facilitating the pivotable movement of the support 62 as the work piece moves across the table. A spring 72 is provided for biasing the member 60 for rotation in a direction opposite to the direction in which the work piece moves across the work surface 12.

The members 60 are suitably mounted on bases 71 and 73 which are attached to the table 10 by bolts 75 which pass through slots 77. The position of the roller 66 with respect to the cutting tool 54 can be adjusted by moving the bases 71 and 73 as desired.

A recess or groove 74 extends across the table 10 as shown. The groove 74 is sufficiently wide that ends of the roller 66 which extend into the groove 74 can move in a sufficiently wide arc to permit acceptance of reasonable excess widths of material. It is desirable that the rollers 66 extend into the groove 74 to insure that the banding 13 bears against the side of the roller 66 rather than permit the possibility of the banding 13 passing between the end of the roller 66 and the surface 12. If desired, individual arcuate grooves in which the rollers 66 move may be provided.

The shield 17 is suitably of the type shown in FIGURES 1 and 3, and may include a generally cylindrical portion 82 and a flat horizontally disposed mounting bracket 84. The mounting is provided with an elongated slot 86 through which set screws 88 pass for attaching the shield 17 to the table 10. A portion of the cylindrical portion 82 is cut away at 90 to a height above the surface 12 sufficient to permit passage of the banding 13 thereunder. The shavings produced by the action of the cutting blade against the work piece are trapped by the shield 17 and fall through the opening 56.

In operation of the machine, the position of the guide fence 14 with relation to the saw blade 30 is adjusted to produce a strip of laminate slightly wider than the thickness of the surface to be covered. As the sheet of laminate is moved across the surface 12, a band of laminate of the desired width will be obtained. The position of the guide fence 14 is thereafter adjusted such that the separation between the edge of the arm 18 and the cutting tool 54 is greater than the thickness of the surface to be covered but sufficient to allow a smooth, straight surface to be produced. The height of the L-shaped bracket 22 is adjusted such that the separation between the bracket 22 and the surface 12 is only slightly greater than the thickness of the band 13 of material, permitting the band 13 to pass beneath the bracket 22 but restraining any upward movement.

As best seen in FIGURE 1, the rollers 66 extend toward the guide fence 14 past the cutting tool 54. As the banding 13 is inserted beneath the channel 22 and moved across the surface 12, it will sequentially engage each of the members 60 causing the member to pivot in a clockwise direction with the spring biasing the member to force the band against the edge of the arm 18 of the guide fence 14. The position of the shield 17 is adjusted such that the edge 92 is sufficiently removed from the fence 14 to permit the passage of the band of material. It can be observed that the edge 94 is only slightly above the planar work surface 12. The shield 17 and the L-shaped bracket 22 are, therefore, available to restrain any tendency of the banding 13 to move upward due to forces produced by the cutting tool 54. After one edge of the strip of banding has been dressed, the separation between the edge of the arm 18 of guide fence 14 and the cutting tool is adjusted to produce a strip of banding of the desired width. The banding 13 is turned and again passed through the machine with the dressed edge bearing against the guide fence 14. It will be noted that the dressed edge will be straight and smooth even though the undressed side may have been somewhat iregular. As the strip of banding is again passed through the machine, the second edge is also dressed, providing the desired amount of bevel.

Figure 6:
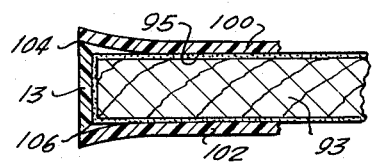
FIGURE 6 is a cross section view illustrating the method of applying a laminate to a surface in accordance with the present invention.

The strip of banding 13 produced by the above operations will be of generally trapezoidal cross section as shown in FIGURE 6, with the narrower of the two bases being substantially equal to the thickness of the material 93 which is to be covered and the other base being somewhat wider. The desired bonding material 95 is applied to all surfaces which are to be covered. The strip of banding produced by the above described machine operations is then applied to the edge of the material 93 as shown. Thereafter, and without the necessity for a drying operation, sheets 100 and 102 of laminate which have been cut to conform to the surfaces to be covered are applied. It is to be noted that it is not necessary that the material used for bonding the banding to the edge of the surface be cured nor is it necessary to perform a routing and sanding step prior to the time that the sheets 100 and 102 can be applied. However, it may be desirable to cut the sheets 100 and 102 over sized and utilize a hand router for fitting their edge smooth with the outer surface of the banding material. It will also be observed that the edges 104 and 106 of the banding material bear against the under surface of the sheets 100 and 102, providing a very close joint whose appearance is not marred by the presence of the bonding material. Although bonding material is not present in the immediate vicinity of the joint, the sheets 100 and 102 are stressed away from the surfaces sufficiently to prevent the appearance of visible cracks.

Although the invention has been described with reference to particular preferred embodiments thereof, many changes and modifications will be obvious to those skilled in the art. The invention is, therefore, to be limited only as necessitated by the scope of the appended claims.

What I claim is:
1. A machine of a character described that comprises a planar work surface, a cutting tool for dressing a front edge of a work piece moving across said work surface, a guide fence extending across said work surface for contacting a rear edge of said work piece while said front edge is being dressed, elongated means adjustably mounted to the edge of said guide fence at a point above said work surface adapted to extend over said work piece and maintain same against said work surface, means for driving said cutting tool and adjustably supporting said cutting tool at a variable vertical angle to bevel the front edge of said work piece, at least one member positioned on either side of said cutter blade for biasing said work piece against said guide fence, each of said members comprising a support pivotally mounted for rotation in a plane substantially parallel to said work surface, spring means biasing each support for rotation in a direction opposite the direction in which said work piece moves across said work surface, an elongated roller rotatably mounted to one end of each support with the axis of rotation of each said roller substantially perpendicular to said work surface, the arc through which each said support moves being sufficiently large that said rollers are deflectable by said work piece from a first position in which said rollers engage the leading edge of said work piece to a second position in which said rollers engage the front edge of said work piece for all angular positions of said cutter blade, and chip deflecting means enclosing the upper end of said cutter blade, said chip deflecting means being open at its lower end with the wall of said chip deflecting means being cut away on the side facing the work piece to permit the work piece to pass beneath said chip deflecting means into contact with said cutter blade, said chip deflecting means being effective as the work piece engages said cutter blade to retard upward movement of the work piece away from the work surface.

2. A machine of a character described that comprises a planar work surface, a cutting tool for dressing a front edge of a work piece moving across said work surface, a guide fence extending across said work surface for contacting a rear edge of said work piece while said front edge is being dressed, elongated means adjustably mounted to the edge of said guide fence at a point above said work surface adapted to extend over said work piece and maintain same against said work surface, means for driving said cutting tool and adjustably supporting said cutting tool at a variable vertical angle to bevel the front edge of said work piece, at least one member positioned on either side of said cutter blade for biasing said work piece against said guide fence, each of said members including a support element journalled for rotation in a plane substantially parallel to the plane of said work surface, an elongated roller rotatably mounted at one end of the support with the axis of rotation of said roller substantially perpendicular to the work surface, resilient means connected to said support biasing said support for rotation in a direction opposite the direction in which the work piece moves across the work surface, stop means associated with each of said members for limiting the rotation of said support whereby the leading edge of the work piece as it moves across the work surface will pass the point at which said support is journalled prior to engaging said elongated roller, the arc through which said support moves being sufficiently large that said roller carried by said support is deflectable by said work piece from a first position in which said roller engages the leading edge of said work piece to a second position in which said roller engages the front edge of said work piece for all angular positions of said cutter.

3. A machine of the character described in claim 2 further including a chip deflecting means enclosing the upper end of said cutter blade, said chip deflecting means being of cylindrical configuration and open at its lower end, the walls of said chip deflecting means being cut away on the side facing the work piece to permit the work piece to pass beneath said chip deflecting means into contact with said cutter blade, said chip deflecting means being effective as the work piece engages the cutter blade to retard upward movement of the work piece away from the work surface.

4. A machine of a character described that comprises a planar work surface, a cutting tool for dressing a front edge of a work piece moving across said work surface, a guide fence extending across said work surface for contacting a rear edge of said work piece while said front edge is being dressed, an elongated L-shaped member adjustably mounted onto said guide fence with one side of said L-shaped member bearing at said guide fence and the other side spaced apart from and substantially parallel to said work surface, the space between the other side of said L-shaped member and the work surface being sufficient to receive said work piece with the other side of said L-shaped member holding said work piece to said work surface, an elongated slot formed in said work surface substantially parallel to said guide fence and underlying the front edge of a strip of banding to be dressed, an opening extending through said work surface and intersecting said slot, means for driving said cutting tool and adjustably supporting said cutting tool with said cutting tool extending through said opening at a desired vertical angle to bevel the front edge of the work piece, at least one member positioned on each side of said cutting tool for biasing the work piece against the guide fence, each of said members including a support element journalled for rotation in a plane substantially parallel to the plane of said work surface, each of said supports having an elongated roller rotatably mounted at one end thereof with the axis of rotation of said roller substantially perpendicular to the work surface, the lower end of each of said rollers extending into said slot whereby said rollers contact the work piece at an intermediate point, resilient means connected to each said support biasing each support for rotation in a direction opposite the direction in which the work piece moves across the work surface, stop means associated with each of said members for limiting the rotation of said support whereby the leading edge of the work piece as it moves across the work surface will pass the point at which said support is journalled prior to engaging said elongated roller, the arc through which said support moves being sufficiently large that said roller carried by said support is deflectable by said work piece from a first position in which said roller engages the leading edge of said work piece to a second position in which said roller engages the front edge of said work piece for all angular positions of said cutter, and chip deflecting means enclosing the upper end of said cutter blade, said chip deflecting means being of cylindrical configuration and open at its lower end, the walls of said chip deflecting means being cut away on the side facing the work piece to permit the work piece to pass beneath said chip deflecting means into contact with said cutter blade, said chip deflecting means being effective as the work piece engages the cutter blade to retard upward movement of the work piece away from the work surface.

References Cited by the Examiner
UNITED STATES PATENTS

| 481,983 | 9/92 | Thom. | |
|---|---|---|---|
| 1,954,610 | 4/34 | Bebie | 156—258 |
| 2,311,766 | 2/43 | Lumbard | 156—258 |
| 2,612,914 | 10/52 | Reynolds. | |
| 2,698,661 | 1/55 | MacQuarrie | 83—446 |
| 2,783,796 | 3/57 | Patterson. | |
| 2,815,076 | 12/57 | Bukrey et al. | 83—446 |
| 2,839,107 | 6/58 | Emmons | 144—218 |
| 2,963,060 | 12/60 | Walther | 144—218 |

WILLIAM W. DYER, Jr, *Primary Examiner.*

DOUGLAS J. DRUMMOND, DONALD R. SCHRAN, *Examiners.*